United States Patent
Noh et al.

(10) Patent No.: US 8,357,288 B2
(45) Date of Patent: Jan. 22, 2013

(54) DEIONIZATION APPARATUS AND METHOD OF MANUFACTURING THE SAME

(75) Inventors: Hyong Soo Noh, Suwon-si (KR); Dao Wook Park, Hwaseong-si (KR); Hideo Nojima, Seongnam-si (KR); Phil Soo Chang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 739 days.

(21) Appl. No.: 12/266,662

(22) Filed: Nov. 7, 2008

(65) Prior Publication Data

US 2009/0218227 A1 Sep. 3, 2009

(30) Foreign Application Priority Data

Feb. 29, 2008 (KR) .................. 10-2008-0018781

(51) Int. Cl.
*C02F 1/46* (2006.01)
(52) U.S. Cl. ...... 205/687; 204/267; 204/269; 204/275.1
(58) Field of Classification Search .................. 205/687; 204/267, 269, 275.1
See application file for complete search history.

(56) References Cited

U.S. PATENT DOCUMENTS

| | | | |
|---|---|---|---|
| 3,658,674 A | 4/1972 | Benak | |
| 5,954,937 A | 9/1999 | Farmer | |
| 5,980,718 A * | 11/1999 | Van Konynenburg et al. | ............................. 204/551 |
| 6,309,532 B1 | 10/2001 | Tran et al. | ..................... 205/687 |
| 6,589,405 B2 | 7/2003 | Weres et al. | |
| 6,761,809 B2 * | 7/2004 | Tran et al. | .................. 204/286.1 |
| 6,830,595 B2 * | 12/2004 | Reynolds, III | ............... 29/25.03 |
| 2004/0129578 A1 | 7/2004 | McLachian et al. | |
| 2005/0103634 A1 | 5/2005 | Andelman et al. | |
| 2008/0067061 A1 | 3/2008 | Zuber et al. | |

FOREIGN PATENT DOCUMENTS

| | | |
|---|---|---|
| EP | 1 403 949 | 3/2004 |
| EP | 1 688 395 | 8/2006 |
| FR | 2 775 007 | 8/1999 |
| GB | 1 463 240 | 2/1977 |
| JP | 10-235362 | 9/1998 |
| JP | 2004-251445 | 9/2004 |
| KR | 10-1999-0043892 | 6/1999 |

(Continued)

OTHER PUBLICATIONS

U.S. Appl. No. 12/533,777, filed Jul. 31, 2009, Ho-jung Yang, Samsung Electronics Co., Ltd.

(Continued)

*Primary Examiner* — Arun S Phasge
(74) *Attorney, Agent, or Firm* — Staas & Halsey LLP

(57) ABSTRACT

A capacitive deionization apparatus, wherein a spacing distance between electrodes of cells is uniformly maintained and a flow in the cells is optimized to improve efficiency of the deionization apparatus and contact resistance between a carbon material and a collector is reduce to improve electrical conductivity, is disclosed. The capacitive deionization apparatus which includes a plurality of electrode modules, each having a collector and electrodes disposed on upper and lower surfaces of the collector to electrically and chemically remove ions from liquid, includes a plurality of plates made of a stiff material are alternately stacked with the electrode modules such that the electrode modules are spaced at specific intervals, wherein the collector and the electrodes are pressed by a pair of adjacent plates among the plurality of plates to maintain a contact therebetween.

28 Claims, 6 Drawing Sheets

FOREIGN PATENT DOCUMENTS

| KR | 10-2001-0042427 | 5/2001 |
|---|---|---|
| KR | 10-2004-0054352 | 6/2004 |
| KR | 10-2004-0078284 | 9/2004 |
| KR | 10-2004-0083573 | 10/2004 |
| KR | 10-2005-0084613 | 8/2005 |
| KR | 10-2006-0024436 | 3/2006 |
| KR | 10-2006-0105034 | 10/2006 |
| KR | 10-2007-0071703 | 7/2007 |
| WO | 92/22096 | 12/1992 |
| WO | 01/90444 | 11/2001 |
| WO | WO 2005/006480 | 1/2005 |

OTHER PUBLICATIONS

European Search Report dated Jul. 1, 2009 in European Patent Application No. 08157483.2.
English Abstract of France Publication No. 2 775 007, Published Aug. 20, 1999.
Patent Abstracts of Japan, Publication No. 10-235362, Published Sep. 8, 1998.
English Abstract of Korea Publication No. 10-2004-0083573, Published Oct. 6, 2004.
Patent Abstracts of Japan, Publication No. 2004-251445, Published Sep. 9, 2004.
English Abstract of Korea Publication No. 10-1999-0043892, Published Jun. 15, 1999.
English Abstract of Korea Publication No. 10-2004-0078284, Published Sep. 10, 2004.
English Abstract of Korea Publication No. 10-2001-0042427, Published May 25, 2001.
English Abstract of Korea Publication No. 10-2004-0054352, Published Jun. 25, 2004.
English Abstract of Korea Publication No. 10-2005-0084613, Published Aug. 26, 2005.
English Abstract of Korea Publication No. 10-2006-0024436, Published Mar. 16, 2006.
English Abstract of Korea Publication No. 10-2006-0105034, Published Oct. 9, 2006.
English Abstract of Korea Publication No. 10-2007-0071703, Published Jul. 4, 2007.
Office Action mailed Nov. 16, 2011 in co-pending U.S. Appl. No. 12/153,818.
J. Liu, I. Watanabe, K. Yoshida, M. Atsuta. "Joint strength of laser-welded titanium." Dental Materials, Mar. 2002, vol. 18, Issue 2, pp. 143-148.
U.S. Appl. No. 12/153,818, filed May 23, 2008, Won Kyoung Lee, Samsung Electronics Co., Ltd.
U.S. Appl. No. 12/457,846, filed Jun. 23, 2009, Hyong Soo Noh, Samsung Electronics Co., Ltd.
Chinese Office Action dated Jul. 4, 2012, from Chinese Patent Application No. 200810178157.8.

* cited by examiner

DEIONIZATION APPARATUS AND METHOD OF MANUFACTURING THE SAME

CROSS-REFERENCE TO RELATED APPLICATION

This application claims the benefit of Korean Patent Application No. 2008-0018781, filed on Feb. 29, 2008 in the Korean Intellectual Property Office, the disclosure of which is incorporated herein by reference.

BACKGROUND OF THE INVENTION

1. Field of the Invention

The present invention relates to an ion removing apparatus capable of removing ions from the liquid, and, more particularly, to a capacitive deionization (CDI) apparatus capable of removing ion components from the liquid using electrical and chemical methods.

2. Description of the Related Art

Among various methods used to purify water containing salt components or heavy metals, a method using ion exchange resin is widely used. However, the method using ion exchange resin is uneconomical in that an acid or base solution should be used in the regeneration of resin and a large amount of polymer resin and chemicals should be used to process a large amount of water.

Recently, a lot of research has been done on a capacitive deionization (CDI) apparatus to overcome the disadvantages.

The capacitive deionization (CDI) technology is based on a simple principle in which anions are electrically adsorbed to a positive electrode and cations are electrically adsorbed to a negative electrode by applying a voltage between two porous carbon electrodes formed in a stack shape to remove ions dissolved in a fluid such as water. Further, when ions adsorbed to the electrodes are saturated, the regeneration of the electrodes can be easily performed by switching the polarity of the electrodes or by cutting off the power supply. Since a cleaning solution (acid, base or the like) is not used for the regeneration of the electrodes as opposed to an ion exchange resin method or a reverse osmosis, there is no subsidiary chemical waste. Further, since the corrosion or contamination of the electrodes hardly occurs, the CDI apparatus has a semi-permanent life span. Also, since energy efficiency is high, energy consumption can be reduced by 90~95% in the CDI technology compared to other processing methods.

An example of the CDI apparatus is disclosed in U.S. Pat. No. 6,309,532.

The CDI apparatus disposed in the patent includes end plates provided at upper and lower ends; a number of electrodes, current collectors, and insulating materials forming a middle layer; and bolts, nuts and sealing to fasten the components; and the like.

The electrodes mainly employ a carbon material having pores with a high specific surface area. The electrodes are adhered to the collector using a conductive material. The collector is made of a material such as a titanium sheet or a carbon foil having good electrical conductivity. A channel is formed at a specific portion of the collector to form a flow path and the electrodes are attached to the opposite surfaces of the collector, thereby forming a single electrode body. However, the uppermost collector and the lowermost collector have a single electrode attached to one surface thereof.

In the CDI apparatus disposed in the patent, a CDI stack is formed by alternately stacking the electrodes, collectors, insulating materials and sealing and fastening them. In the CDI stack, when positive (+) and negative (−) voltages are alternately applied to the electrodes and water flows into an upper or lower inlet, the water moves in a zigzag through channels formed on the collectors and ion components included in the water are adsorbed to the carbon material of the electrodes. After a specific level of adsorption is performed, a negative (−) voltage is applied to the positive electrode and a positive (+) voltage is applied to the negative electrode, ion components adsorbed to the carbon material are removed and the regeneration of the electrodes is simply achieved.

However, in the CDI apparatus disposed in the patent, the carbon material and the collector are adhered to each other using conductive epoxy or the like in the manufacture of the electrodes. Accordingly, the pores of the carbon material may be partially clogged and electrical conductivity may deteriorate due to contact resistance.

Further, since each layer is sealed using a gasket made of rubber or Teflon, when a number of cells are stacked and fastened to each other, upper, middle and lower cells cannot be fastened with a uniform force. Accordingly, since the cells are spaced by different distances, a uniform voltage cannot be applied to the cells. As a result, ion removal efficiency decreases in some cells.

Further, titanium or metal having the same function is used as the collector. In this case, the manufacturing cost increases. If other metals are used to reduce the manufacturing cost, the metals may be corroded. Further, in a case of using an inexpensive carbon foil, since the boundary of the collector is exposed to the outside in the structure disposed in the patent, there is a problem that the collector may be damaged.

SUMMARY OF THE INVENTION

It is an aspect of the invention to provide a capacitive deionization apparatus capable of reducing contact resistance between a carbon material and a collector in the manufacture of electrodes to improve electrical conductivity and capable of preventing pores of the carbon material from being partially clogged.

It is another aspect of the invention to provide a capacitive deionization apparatus capable of maintaining a uniform spacing distance between the stacked collectors, thereby improving ion removal efficiency.

Further, it is another aspect of the invention to provide a capacitive deionization apparatus having collectors capable of reducing the manufacturing costs and preventing damage.

Further, it is a further aspect of the invention to provide a capacitive deionization apparatus capable of improving ion removal efficiency by installing a structure in a unit cell to vary a total distance along which water flows on the surfaces of the electrodes.

Additional aspects and/or advantages of the invention will be set forth in part in the description which follows and, in part, will be obvious from the description, or may be learned by practice of the invention.

In accordance with an aspect of the invention, there is provided a capacitive deionization apparatus which includes a plurality of electrode modules, each having a collector and electrodes disposed on upper and lower surfaces of the collector to electrically and chemically remove ions from liquid, comprising: a plurality of plates made of a stiff material are alternately stacked with the electrode modules such that the electrode modules are spaced at specific intervals, wherein the collector and the electrodes are pressed by a pair of adjacent plates among the plurality of plates to maintain a contact therebetween.

Preferably, a hollow portion is formed in each of the plates, and each of the electrode modules is safely placed on in the hollow portion of the pair of plates and pressed by a boundary of the hollow portion.

Preferably, unit cells which adsorb ions are formed between adjacent electrode modules among the plurality of electrode modules, and a spacing member is disposed in each of the unit cells to maintain a specific distance.

Preferably, the spacing member includes a guide which guides a flow of liquid.

Preferably, the guide divides an inner portion of the unit cell to increase a flowing time of the liquid passing through the unit cell.

Preferably, each of the electrode modules includes a channel corresponding to a width of a flow path defined by the guide.

Preferably, the spacing member is formed on the hollow portion as a single body.

Preferably, the spacing member presses each of the electrode modules to maintain a contact between the electrodes and the collector.

Preferably, the spacing member includes a turbulent flow generation portion to generate a turbulent flow in a flow of the liquid in the unit cell.

Preferably, the deionization apparatus further includes a pair of end plates which are disposed at opposite ends of a stack structure formed by the plurality of electrode modules and the plurality of plates, each end plate having an opening for inlet or outlet of liquid, wherein at least one of the pair of end plates has a buffer space to buffer a pressure of the liquid flowing into the opening.

Preferably, the deionization apparatus further includes first sealing members to prevent the liquid from leaking between the electrode modules and the plates.

Preferably, the deionization apparatus further includes second sealing members which disposed around the first sealing members to prevent the liquid from leaking between the adjacent plates.

Preferably, the plates include fixing grooves to fix the first and second sealing members.

Preferably, the plates are molded of a resin material.

Preferably, the plates are larger than the electrode modules by a specific size, the apparatus further includes a terminal to supply a power to each of the electrode modules, and the terminal is coupled to the collector on each of the plates.

In accordance with another aspect of the invention, there is provided a capacitive deionization apparatus which electrically and chemically removes ions from liquid, comprising: a plurality of spacer units having a plurality of electrode modules and a plurality of plates which support boundaries of the plurality of electrode modules spaced at specific intervals, a pair of end plates which are disposed at opposite ends of the plurality of spacer units and have openings for inlet or outlet of liquid, and coupling members which couple the plurality of spacer units and the pair of end plate units wherein the plurality of plates are made of a stiff material to uniformly maintain a spacing distance between the plurality of electrode modules regardless of a fastening force of the coupling members.

Preferably, each of the electrode modules includes a collector and electrodes having a size corresponding to the collector and disposed on upper and lower surfaces of the collector, and boundaries of the electrode modules are pressed by a pair of adjacent plates among the plurality of plates to maintain a contact therebetween.

Preferably, a spacing member is disposed between adjacent electrode modules among the plurality of electrode modules, and an inner portion of a boundary of each of the electrode modules is pressed by the spacing member to maintain a contact between the electrodes and the collector.

Preferably, the spacing member is formed as a single body with each of the plates to guide a flow of the liquid.

Preferably, the spacer units further include sealing members to prevent the liquid from leaking between the electrode modules and the plates.

Preferably, each of the spacer units further includes a terminal to supply a power to each of the electrode modules, and each of the plates further includes a terminal insertion portion to mount the terminal thereon such that the terminal is coupled to the collector on each of the plates.

In accordance with a further aspect of the invention, there is provided a method of manufacturing a capacitive deionization apparatus which electrically and chemically removes ions from liquid, comprising: alternately stacking electrode modules and plates, which support boundaries of the electrode modules and are made of a stiff material to uniformly maintain a spacing distance between the electrode modules, on a first end plate having an opening for inlet or outlet of liquid; mounting a second end plate having an opening for inlet or outlet of liquid to correspond to the first end plate; and coupling the first and second end plates with the plates.

In the deionization apparatus according to the present invention, since the collector and the electrodes can be fixed without an adhesive agent, it is possible to prevent the pores of the electrodes from being clogged and to prevent a reduction of electrical conductivity due to contact resistance.

Further, according to the present invention, since the electrode modules can be spaced at specific intervals using the plates made of a stiff material, it is possible to apply a uniform voltage to the cells, thereby improving ion removal efficiency.

Further, according to the present invention, since various flow paths can be formed using the guides formed on the cells, it is possible to allow water to flow along a long flow path and also possible to increase the water residence time on the surfaces of the electrodes, thereby improving the ion removal efficiency.

Further, according to the present invention, since the collector is connected to the terminal on the plate, it is possible to prevent the collector from being damaged.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
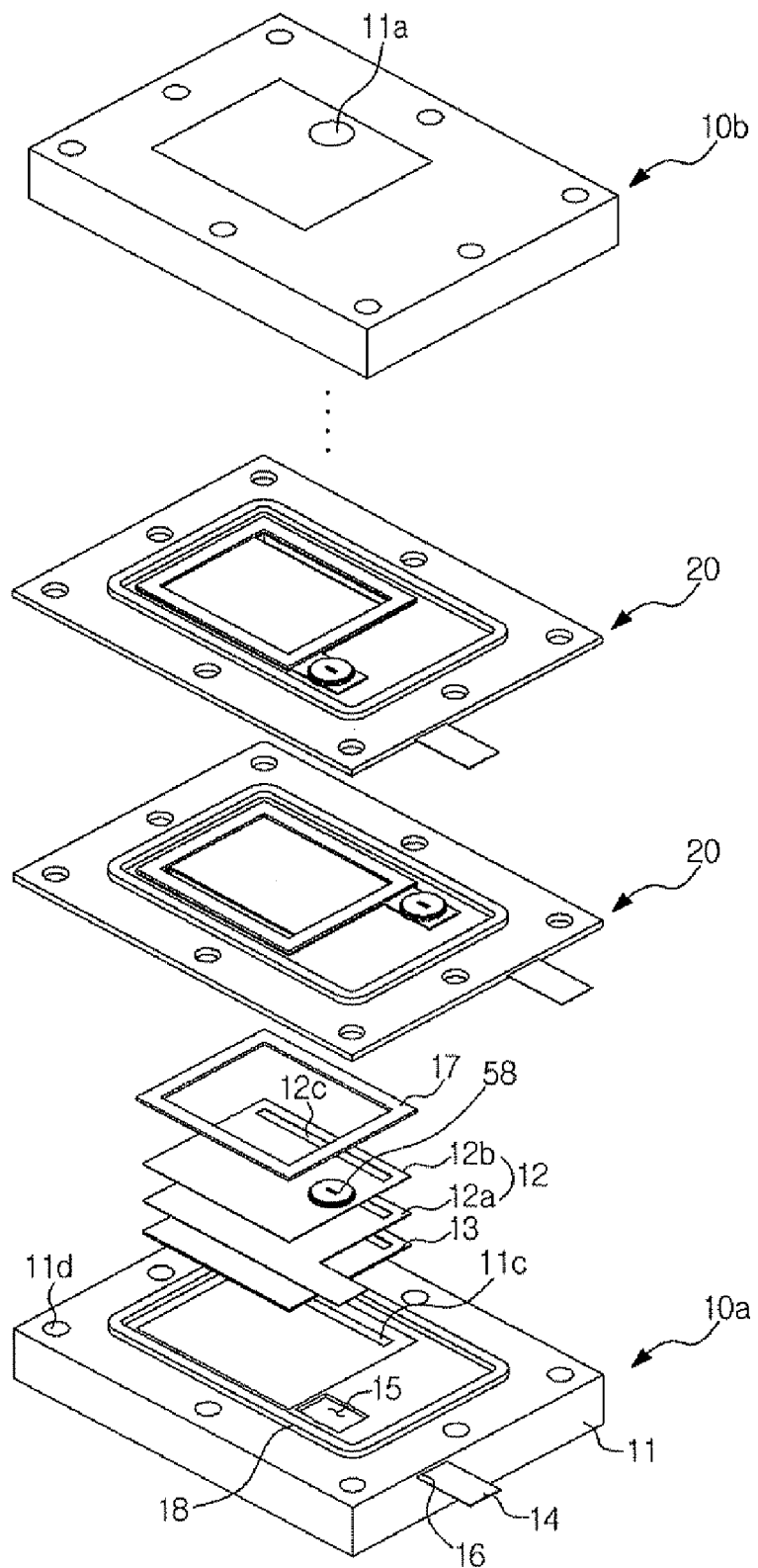
FIG. 1 illustrates an exploded perspective view of a capacitive deionization apparatus according to an embodiment of the present invention.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Hereinafter, a capacitive deionization apparatus according to an embodiment of the present invention will be described in detail with reference to the accompanying drawings.

Figure 2:
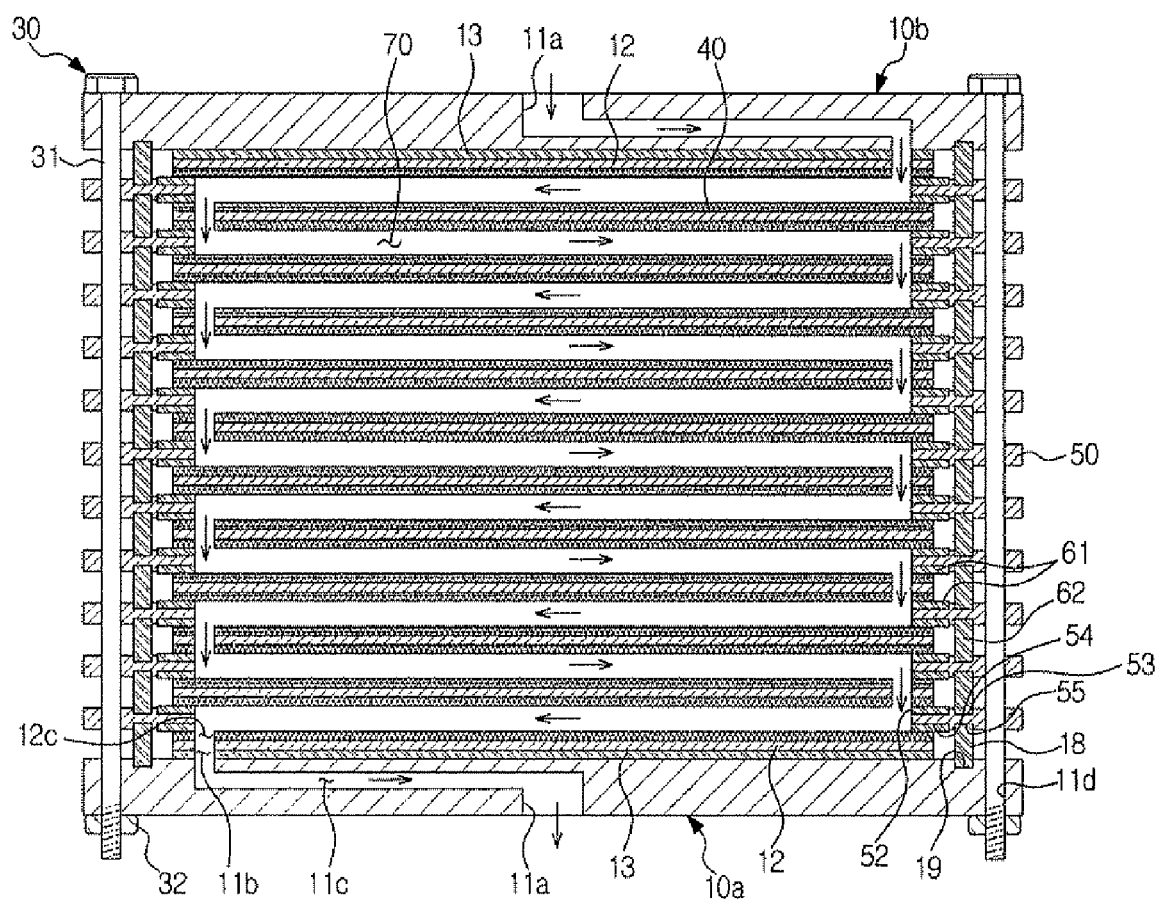
FIG. 2 illustrates a cross-sectional view of the capacitive deionization apparatus according to the embodiment of the present invention.
Figure 3:
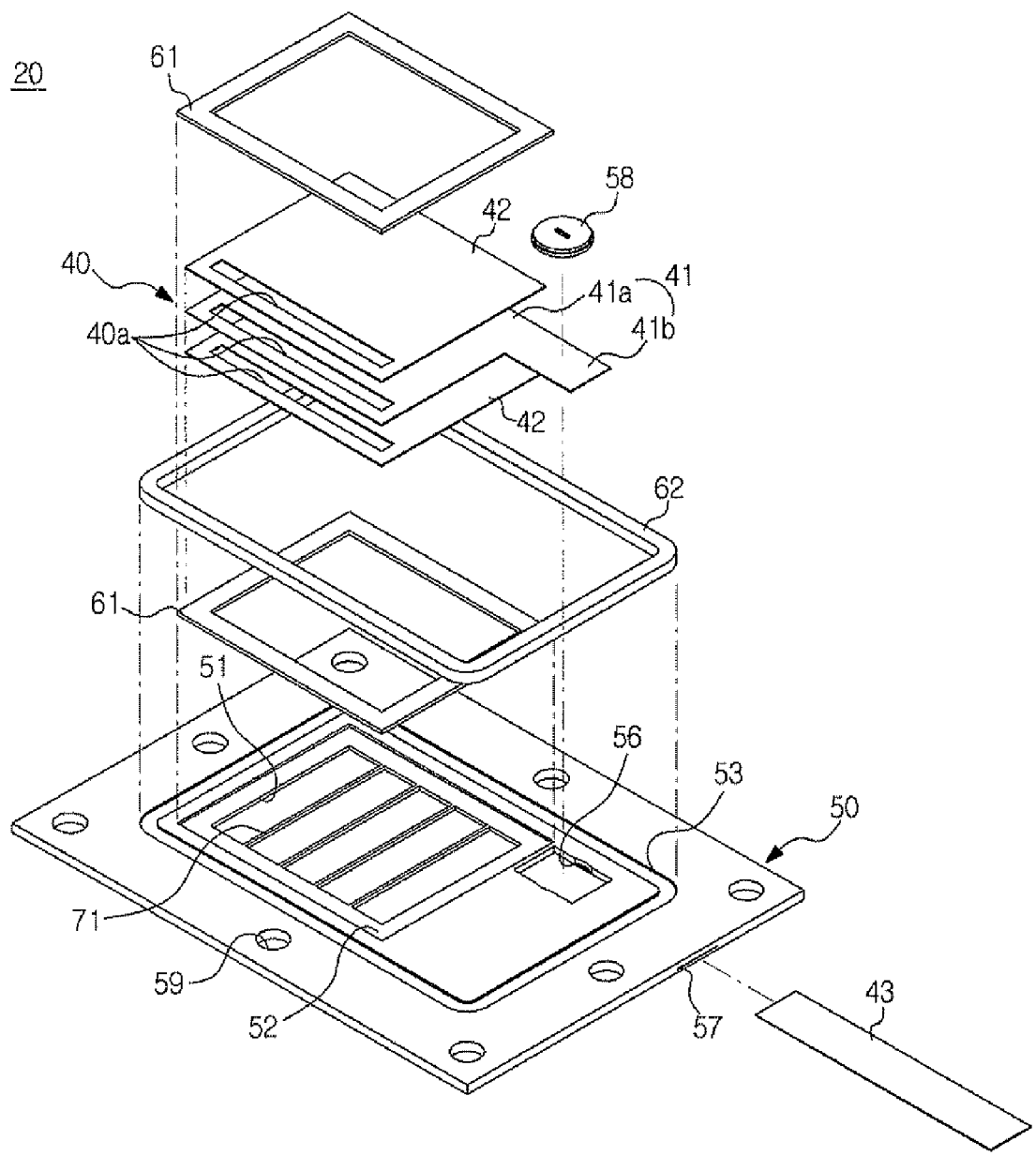
FIG. 3 illustrates an exploded perspective view of a spacer unit included in the capacitive deionization apparatus according to the embodiment of the present invention.

FIG. 1 illustrates an exploded perspective view of the capacitive deionization apparatus according to the embodiment of the present invention. FIG. 2 illustrates a cross-sectional view of the capacitive deionization apparatus according to the embodiment of the present invention. FIG. 3 illustrates an exploded perspective view of a spacer unit included in the capacitive deionization apparatus according to the embodiment of the present invention.

The capacitive deionization apparatus (hereinafter, referred to as a "CDI apparatus") according to the embodiment of the present invention is an apparatus which electronically and chemically removes ions from the liquid. As shown in FIGS. 1 and 2, the CDI apparatus includes a pair of end plate units 10a and 10b which form upper and lower ends of the CDI apparatus and have openings 11a for inlet and outlet of liquid, a plurality of spacer units 20 having a plurality of plates 50 which are disposed between the end plate units 10a and 10b to support boundaries of a plurality of electrode modules 40 spaced at specific intervals, and coupling members 30 which couple the plurality of spacer units 20 and the pair of end plate units 10a and 10b.

The CDI apparatus has a stack structure in which the plurality of spacer units 20 are stacked on any one plate unit (end plate unit 10a) and the other plate unit (end plate unit 10b) is stacked thereon. Unit cells 70 which adsorb ions are formed between the adjacent electrode modules 12 and 40 and as many as the number of the plates 50.

The pair of end plate units 10a and 10b include a first end plate unit 10a which forms a lower external appearance of the CDI apparatus and a second end plate unit 10b which forms an upper external appearance thereof.

Since the first and second end plate units 10a and 10b have the same configuration, only the first end plate unit is described, and the description of the second end plate unit is replaced by the description of the first end plate unit.

The first end plate unit 10a includes an end plate 11, an end electrode module 12 disposed on the end plate 11 and a support member 13 disposed between the end plate 11 and the end electrode module 12.

The opening 11a for inlet and outlet of liquid is formed on one surface of the end plate 11 to be connected to an external liquid supply line. A channel 11b is formed on the other surface of the CDI apparatus such that the liquid flows into or out of the CDI apparatus through the channel 11b.

Further, the end plate 11 is has a thickness equal to or larger than a specific thickness at which bending does not occur in fastening of the coupling members 30 after stacking the first end plate unit 10a and the spacer unit 20. The end plate 11 may be made of various materials such as metal, plastic, rubber or the like, but it is preferable that the end plate 11 is made of plastic for insulation.

A buffer space 11c is formed in the end plate 11 to buffer the pressure of liquid flowing into the opening 11a. Accordingly, the liquid supplied from the external liquid supply line flows into the CDI apparatus through the buffer space 11c.

The buffer space 11c buffers the pressure of the inflow liquid to prevent the electrode modules 12 and 40 inside the CDI apparatus from being damaged due to the pressure of the inflow liquid.

Further, a terminal coupling portion 15 is formed on the end plate 11 to couple a terminal 14 which applies a power to the end electrode module 12 with a collector 12a. A terminal insertion portion 16 having a width corresponding to the terminal 14 is formed on the side surface of the end plate 11 to guide the terminal 14 to the terminal coupling portion 15.

The end electrode module 12 includes the collector 12a and an electrode 12b disposed on one surface of the collector 12a.

In this case, the support member 13 having a size corresponding to the end electrode module 12 is formed of an elastic material such as silicone or rubber between the end electrode module 12 and the end plate 11 to uniformly distribute the pressure to the end electrode module 12 in fastening of the coupling members 30 and to prevent the liquid from leaking between the end plate 11 and the end electrode module 12.

Further, channels 12c corresponding to the channel 11b of the end plate 11 are formed on the end electrode module 12 and the support member 13 to guide the liquid into or from the CDI apparatus.

End sealing members 17 and 18 are provided to prevent the liquid from leaking through a gap between the end plate 11 and the spacer unit 20 adjacent to the end plate 11. The end sealing members 17 and 18 include a first end sealing member 17 disposed at an upper boundary of the end electrode module 12 and a second end sealing member 18 disposed on the outside of the first end sealing member 17. In this case, a fixing groove 19 is formed on the end plate 11 along a periphery to guide seating of the second end sealing member 18.

The end sealing members 17 and 18 are generally formed of elastic rubber or a material similar thereto, and are pressed between the end plate 11 and the spacer unit 20 to prevent leakage of the liquid.

Fastening holes 11d are arranged at specific intervals on the outside of the fixing groove 19 for fastening of the coupling members 30.

The plurality of spacer units 20 disposed between the pair of end plate units 10a and 10b are formed in the same shape. As shown in FIG. 3, each of the spacer units 20 includes the electrode module 40, a terminal 43 which applies a power to the electrode module 40, the plate 50 which supports the electrode module 40 to be spaced from the electrode module 40 of the adjacent spacer unit 20 by a specific distance, and sealing members 61 and 62 which prevent the liquid in the stack structure of the CDI apparatus from leaking out of the CDI apparatus.

The electrode module 40 includes a collector 41 and porous electrodes 42 disposed on the upper and lower surfaces of the collector 41. The collector 41 includes a body 41a formed in a size corresponding to the electrodes 42 and an extended portion 41b which is extended from the body 41a to connected to the terminal 43.

The collector 41 may employ metal such as titanium having good electrical conductivity, a carbon foil or the like. In this embodiment, the collector 41 is made of a carbon foil without corrosion to reduce the manufacturing costs.

The porous electrodes 42 may employ a conductive material having many pores and a good adsorptive performance, for example, carbon aerogel, carbon nanotubes, graphite nanofibers, an activated carbon electrode, active carbon, metal oxide or the like.

The electrodes 42 can be adhered to the opposite surfaces of the collector 41 using a conductive adhesive material such as conductive paste, conductive tapes, and other conductive binder materials.

However, in a case where the collector 41 and the electrodes 42 are adhered to each other using the adhesive material, the pores of the porous electrodes 42 may be partially clogged, and electrical conductivity may deteriorate due to contact resistance.

Accordingly, in the present invention, the collector 41 and the electrodes 42 are pressed by a pair of the adjacent plates 50 among the plurality of plates 50 to maintain a contact therebetween, whereby the electrodes 42 can be attached to the collector 41 without adhesion. The detailed configuration thereof will be described later.

A channel 40a is formed at one side of the electrode module 40 such that the liquid passes to the next cell 70. The size and shape of the channel 40a may vary according to the shape of a channel guide to be described later.

The plate 50 is formed in an approximately rectangular shape having a specific thickness. A hollow portion 51 is formed in the plate 50 to have a size smaller than the size of the electrode module 40 such that the electrode module 40 can be placed on the boundary of the hollow portion 51. The plate 50 may be made of a stiff and nonconductive material. The plate 50 may employ incompressible plastic, which is not substantially compressed when it is pressed by fastening members, and other polymer materials.

The sealing members 61 and 62 which prevent the liquid in the stack structure of the CDI apparatus from leaking out of the CDI apparatus include first sealing members 61 which are disposed on the upper and lower surfaces of the boundary of the hollow portion 51 to prevent the liquid from leaking between the electrode module 40 and the plate 50, and second sealing members 62 which are disposed on the upper or lower surface of the plate 50 to prevent the liquid from leaking between the adjacent plates 50.

The sealing members 61 and 62 are formed in the same shape and material as those of the end sealing members. The sealing members 61 and 62 are formed of an insulating material having a specific elasticity such as silicone, rubber and a foaming agent.

In this case, the first sealing members 61 are formed as a pair of sealing members and are stacked to cover the upper and lower surfaces of the boundary of the electrode module 40.

Fixing grooves 52, 53, 54 and 55 are disposed on the plate 50 corresponding to the first and second sealing members 61 and 62 to fix the first and second sealing members 61 and 62. The fixing grooves 52, 53, 54 and 55 include a first upper fixing groove 52 which fixes the first sealing member 61, a second upper fixing groove 53 which fixes the second sealing member 62, and first and second lower fixing grooves 54 and 55 which fix the first and second sealing members 61 and 62 included in the adjacent spacer unit 20 at the lower side of the plate 50 (see FIG. 2).

The fixing grooves 52, 53, 54 and 55 allow inner components to be installed at accurate positions by uniformly maintaining the positions of the respective spacer units 20 in stacking of the spacer units 20.

Accordingly, any one of the first sealing members 61 is fixed to the first upper fixing groove 52, and the electrode module 40 is placed thereon. Then, the other one of the first sealing members 61 is placed on the boundary of the electrode module 40, and the second sealing member 62 is fixed to the second upper fixing groove 53.

When the spacer unit having the same configuration is stacked on the spacer unit 20 having the above configuration, the first and second sealing members 61 and 62 of the lower spacer unit 20 is safely inserted into the first and second lower fixing grooves 54 and 55 formed on the lower surface of the plate 50 of the upper spacer unit 20, thereby preventing leakage of the liquid.

Further, when the components of the CDI apparatus of the stack structure are pressed and coupled using the coupling members 30, since the boundaries of the hollow portions 51 of the plates 50 press the boundary of the electrode module 40 disposed between the plates 50, it is possible to maintain a contact between the electrodes 42 and the collector 41 without attaching the electrodes 42 to the collector 41 using an additional conductive adhesive material.

Since the first sealing members 61 are formed as thin sheets made of an elastic material, the first sealing members 61 are rarely deformed by a pressing force. Accordingly, when the components of the CDI apparatus are coupled using the coupling members 30, the electrode modules 40 are spaced by a specific distance as much as the thickness of the plate 50, more accurately, the thickness of both the plate 50 and the first sealing member 61 coupled to the first fixing groove 52 formed at the boundary of the plate 50. Thus, since a spacing distance between the electrode modules 40 is uniformly maintained regardless of attachment positions of the spacer units 20 in the CDI apparatus to apply the same voltage to the cells 70, it is possible to improve an ion removal efficiency.

Figure 4:
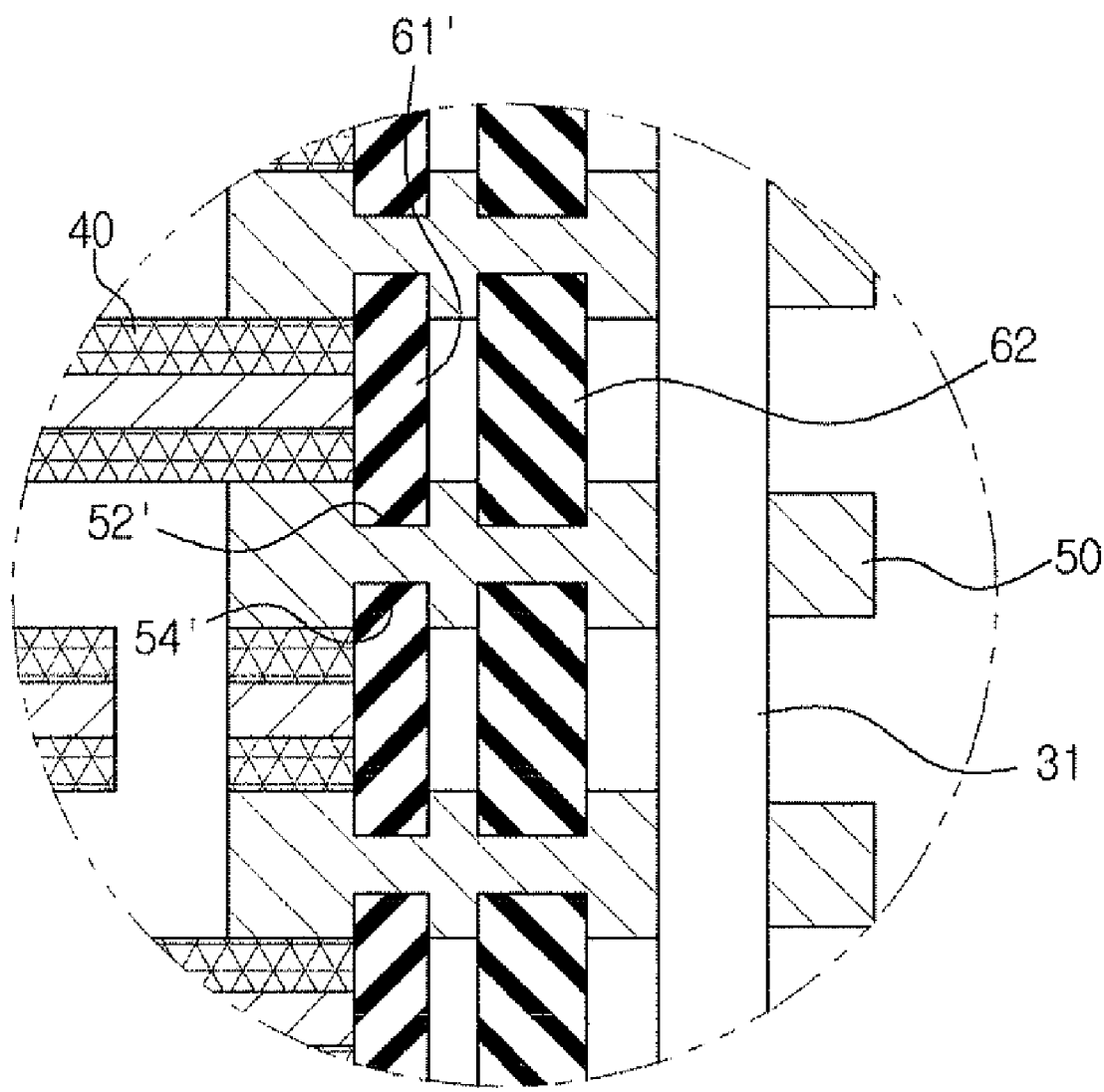
FIG. 4 illustrates a cross-sectional view of essential parts showing a stack structure of a deionization apparatus according to a modified embodiment of the present invention.

FIG. 4 illustrates a cross-sectional view of essential parts showing the stack structure of a deionization apparatus according to a modified embodiment of the present invention.

In the modified embodiment of the stack structure of the plates 50, the electrode modules 40 and the first sealing members 61, as shown in FIG. 4, first sealing members 61' may be fixed on the outside of the side surfaces of the electrode modules 40. In this case, first upper and lower fixing grooves 52' and 54' are formed on the plates 50 corresponding to the first sealing members 61' to fix the first sealing members 61'. By using the above structure, it is possible to obtain the same effect as in the first embodiment of the present invention, and also possible to prevent a fine distance difference from being generated between the electrode modules 40 due to deformation caused by pressing the first sealing members 61' made of an elastic material. Accordingly, the distance between the adjacent electrode modules 40 can be uniformly maintained at the thickness of the plates 50.

Returning to the first embodiment of the present invention, as shown in FIG. 3, a terminal coupling portion 56 is disposed on the plate 50 to couple the terminal 43 which applies a power to the electrode module 40 with the collector 41. A terminal insertion portion 57 having a width corresponding to the terminal 43 is formed on the side surface of the plate 50 to guide the terminal 43 to the terminal coupling portion 56.

The terminal 43 is made of a conductive sheet without being torn or broken. The terminal 43 is connected to the extended portion 41b of the collector 41 on the terminal coupling portion 56 and fixed using a clamp 58. Although the clamp 58 is inserted into a groove of the terminal coupling portion 56 to couple the terminal 43 with the extended portion 41b in the embodiment of the present invention, the terminal may be coupled with the extended portion using a screw or the like.

The terminal 43 may be easily connected to a power line by soldering or the like at the outside.

Accordingly, since the collector 41 is positioned on the inside of the plate 50 and only the terminal 43 for application of power is extracted outward in the embodiment of the present invention, there is no worry that the collector 41 is damaged even when the collector 41 is formed of a material such as a carbon foil which is relatively inexpensive and tends to be torn.

Further, fastening holes 59 corresponding to the fastening holes 11d of the end plate 11 are formed on the outside of the fixing groove 53 in a circumferential direction to be spaced from the fixing groove 53 by a specific distance in order to couple the plurality of spacer units 20 and the pair of end plate units 10a and 10b forming the stack structure.

Spacing members 71 are disposed in the hollow portion 51 of the plate 50 to maintain a specific distance between the adjacent electrode modules 40.

That is, since the boundaries of the electrode modules 40 are safely placed on the plates 50, it is possible to maintain a specific distance between the boundaries of the respective electrode modules 40. If the size of the electrode modules 40 is large, it is relatively difficult to maintain a specific distance between central portions of the electrode modules 40 than between the boundaries of the electrode modules 40. Particularly, it is more difficult in a case where an adhesive material is not used between the collector and the electrodes of the electrode module as in the embodiment of the present invention.

Accordingly, the spacing members 71 are disposed in the hollow portion 51 of the plate 50 to maintain a uniform distance between the adjacent electrode modules 40 over the whole area.

The spacing members 71 may be formed as separate members to be inserted in the hollow portion 51 defined by the adjacent electrode module 40. However, preferably, the spacing members 71 are extended from the boundary of the hollow portion 51 to be formed as a single body with the plate 50.

The spacing members 71 may serve as a channel guide which guides liquid flowing in the unit cells 70.

Figure 5:
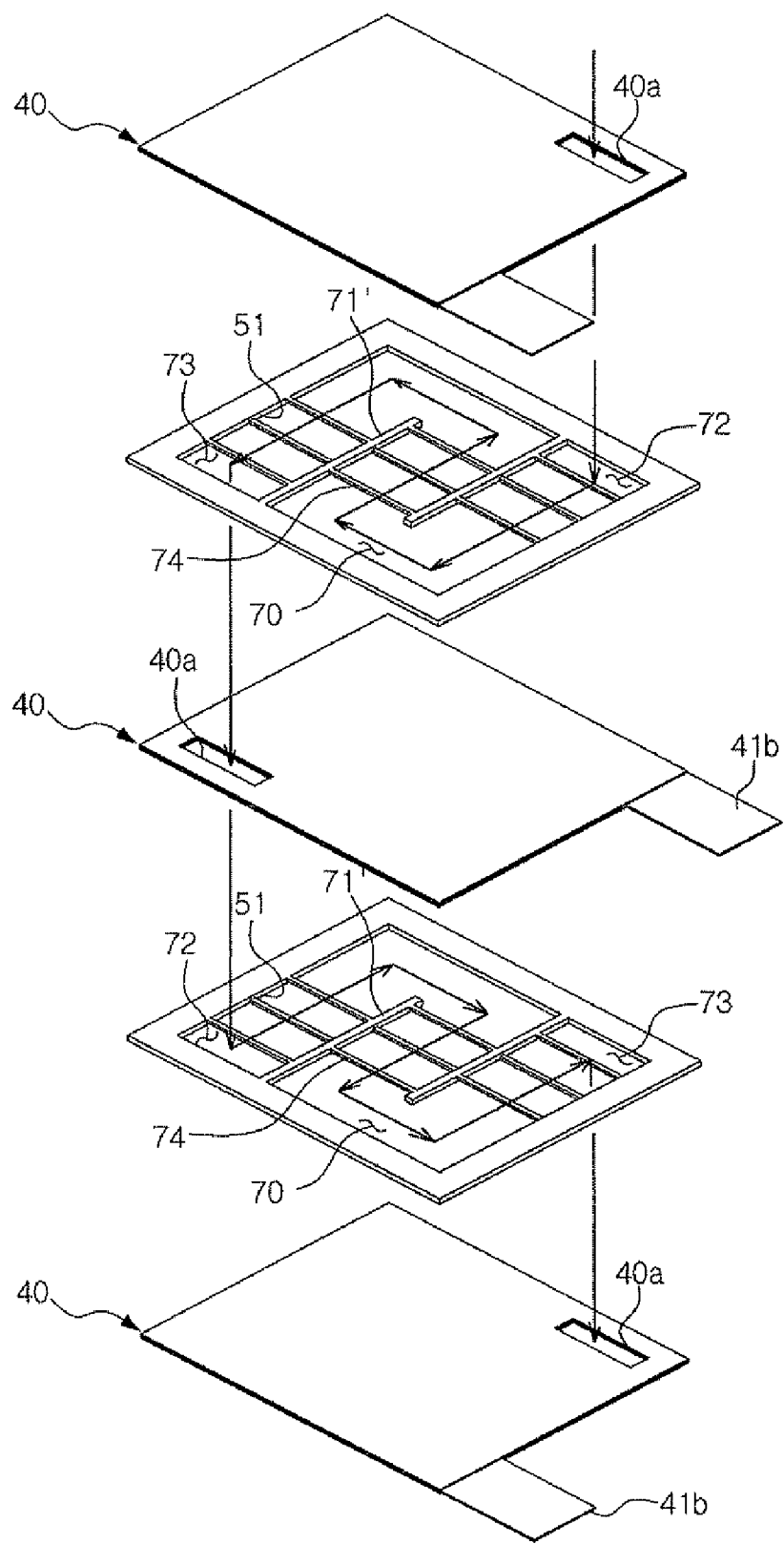
FIGS. 5 and 6 illustrate schematic views showing a flow of liquid in the capacitive deionization apparatus according to the present invention.
Figure 6:
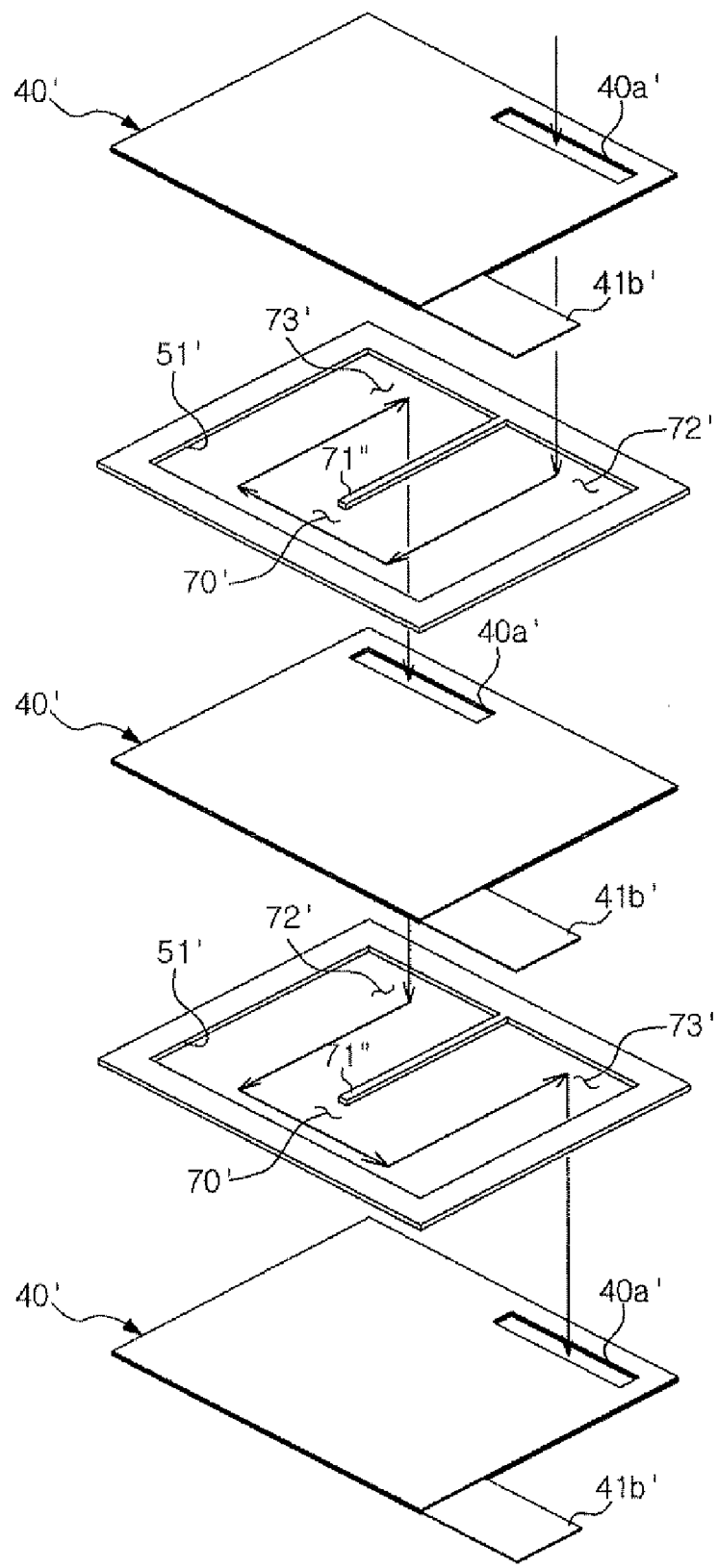

FIGS. 5 and 6 illustrate schematic views showing a flow of liquid in the capacitive deionization apparatus according to the embodiment of the present invention.

In this case, as shown in FIGS. 5 and 6, the spacing members are formed as at least one member (guides 71' and 71''), which is protruded from substantially the side surface of the boundary, thereby forming channels of various shapes in the unit cell 70 formed by the pair of electrode modules 40.

The width and a total path of the channel may vary according to the positions and the number of the guides 71' and 71''. Since the distance between the adjacent electrode modules 40 is determined by the thickness of the guides 71' and 71'' and the thickness of the boundary of the plate 50, preferably, the thickness of the boundary of the plate 50 is made to be substantially equal to the thickness of the guides 71' and 71''. In this case, the thickness may vary according to the capacity and the size, but may be formed at about 0.1~20 mm.

In this case, the widths of the channels 40a and 40a' of the electrode modules 40 and 40' are formed corresponding to inlets 72 and 72' and outlets 73 and 73' of the respective cells 70 and 70'.

Accordingly, the guides 71' and 71'' are provided to increase flowing time of the liquid flowing in the respective cells 70. Thus, there is an effect of improving an ion removal efficiency of the electrode modules 40.

Further, as shown in FIG. 5, turbulent flow generation portions 74 are formed in the hollow portion 51 to be inclined to a flowing direction of the liquid. Preferably, the turbulent flow generation portions 74 are formed in a ladder shape on the guides 71' to increase the pressure in the respective cells and to generate a turbulent flow, thereby mixing the liquid flowing in the cells in upper and lower directions.

Accordingly, since the positions of the ions at a portion in which an electric force is weak in the flow are changed, the ions passing through the cells 70 are adsorbed to the electrodes 42, and an ion removal performance is improved. In this case, the turbulent flow generation portions 74 are arranged nonuniformly on the guides 71' by varying their heights in a state perpendicular to the flowing direction of the liquid, thereby efficiently generating a turbulent flow.

The coupling members 30 include a bolt-shaped rod 31 and a nut 32 to fasten components of the stack structure. A uniform fastening pressure is maintained in the fastening of the coupling members 30.

Hereinafter, the assembly of the CDI apparatus according to the embodiment of the present invention will be described.

The support member 13 is disposed on the first end plate 11 having the opening 11a for inlet or outlet of liquid. Then, the end electrode module 12 is stacked on the end plate 11 and the end sealing members 17 and 18 are fixed thereon.

Then, the spacer units 20 are stacked by alternately stacking the plates 50 made of a stiff material and the electrode modules 40 disposed at the boundaries of the plates 50.

In stacking of the spacer units 20, the upper spacer unit 20 is guided by the second sealing member 62 provided in the second upper fixing groove 53 of the plate 50 included in the lower spacer unit 20 adjacent to the upper spacer unit 20. Accordingly, assembly workability can be improved.

After stacking the spacer units 20, the second end plate 11 having the opening 11a for inlet or outlet of liquid is mounted corresponding to the first end plate 11, and the stack structure is fixed using the coupling members 30.

Accordingly, the electrode modules 40 are safely placed on the plates 50 made of a stiff material and the plates 50 are fastened to each other by the coupling members 30, thereby uniformly distributing the assembly pressure to the cells 70, and uniformly maintaining a distance between the adjacent electrode modules 40 corresponding to the thickness of the boundary of the plate 50. Thus, it is possible to uniformly maintain a voltage of each cell 70, and also possible to improve the use efficiency of electrodes of the cells 70.

Next, the operation of the CDI apparatus according to the embodiment of the present invention will be described.

When a power is supplied to the collector 41 through the terminal 43, positive (+) and negative (−) voltages are alternately applied to the stacked electrodes. When liquid, for example, water flows into the opening 11a of any one of the first and second end plates 11, the water passes through the buffer space 11c to flow into the stack structure through the channel 11b.

The liquid flows in the cells 70, and ions included in the water are adsorbed to the pores of the electrodes 42 of the electrode modules 40 by a positive (+) or negative (−) electric force applied to the electrodes. As a result, it is possible to obtain soft water from which ions are removed at the opening 11a forming an outlet. Then, ions adsorbed on the electrodes 42 can be removed from the electrodes by switching the polarity of the electrodes 42 or by injecting water while the power supply is cut off. The removed ions are discharged with water thorough the opening.

Although the end plates are formed at upper and lower sides in the structure of the embodiment of the present invention, the end plates may be installed at left and right sides.

The water which has flowed through the opening 11a of the upper end plate 11 flows toward the lower end plate 11 along a flow path formed in a zigzag shape according to the arrangement of the channels 40a of the electrode modules 40.

Further, as shown in FIGS. 5 and 6, the water, which has flowed into the inlets 72 and 72' of the cells 70 and 70' after passing through the channels 40a and 40a' of the electrode modules 40 and 40', flows along the zigzag-shaped path by the guides 71' and 71" toward the outlets 73 and 73' of the cells 70 and 70', which communicate with the channels 40a and 40a' of the adjacent electrode modules 40 and 40'.

Accordingly, since the water flows along a long flow path formed on the unit cells 70, it is possible to increase the water residence time on the surfaces of the electrodes 42, thereby improving the ion removal efficiency compared to the conventional technology.

Further, as shown in FIG. 5, the turbulent flow generation portions 74 are formed on the guides 71' to mix the liquid flowing in the cells 70 in upper and lower directions. Accordingly, the ions passing through the cells 70 are adsorbed to the electrodes 42, and it is possible to improve the ion removal performance.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A capacitive deionization apparatus which includes a plurality of electrode modules, each having a collector and electrodes disposed on upper and lower surfaces of the collector to electrically and chemically remove ions from liquid, comprising:
    a plurality of plates alternately stacked with the plurality of electrode modules such that the plurality of electrode modules are spaced at specific intervals; and
    first sealing members disposed on each of the plurality of plates to cover upper and lower surfaces of each of the plurality of electrode modules to prevent the liquid from leaking between the plurality of electrode modules and the plurality of plates,
    wherein the collector and the electrodes of each electrode module among the plurality of electrode modules are pressed by a pair of adjacent plates among the plurality of plates to maintain a contact therebetween.

2. The deionization apparatus according to claim 1, wherein a hollow portion is formed in each of the plates among the plurality of plates, and each of the electrode modules among the plurality of electrode modules is placed in the hollow portion of the pair of adjacent plates and pressed by a boundary of the hollow portion.

3. The deionization apparatus according to claim 2, wherein unit cells which adsorb ions are formed between adjacent electrode modules among the plurality of electrode modules, and a spacing member is disposed in each of the unit cells to maintain a specific distance.

4. The deionization apparatus according to claim 3, wherein the spacing member includes a guide which guides a flow of liquid.

5. The deionization apparatus according to claim 4, wherein the guide divides an inner portion of the unit cell to increase a flowing time of the liquid passing through the unit cell.

6. The deionization apparatus according to claim 5, wherein each of the electrode modules among the plurality of electrode modules includes a channel corresponding to a width of a flow path defined by the guide.

7. The deionization apparatus according to claim 3, wherein each spacing member is formed as a single body with each plate among the plurality of plates, and each spacing member is disposed in the hollow portion of each plate among the plurality of plates.

8. The deionization apparatus according to claim 3, wherein the spacing member presses each of the electrode modules among the plurality of electrode modules to maintain a contact between the electrodes and the collector.

9. The deionization apparatus according to claim 3, wherein the spacing member includes a turbulent flow generation portion to generate a turbulent flow in a flow of the liquid in the unit cell.

10. The deionization apparatus according to claim 1, further comprising a pair of end plates which are disposed at opposite ends of a stack structure formed by the plurality of electrode modules and the plurality of plates, each end plate having an opening for inlet or outlet of liquid,
    wherein at least one of the pair of end plates has a buffer space to buffer a pressure of the liquid flowing into the opening.

11. The deionization apparatus according to claim 1, wherein the first sealing members are disposed on a first rectangular fixing groove disposed on each of the plurality of plates.

12. The deionization apparatus according to claim 11, further comprising second sealing members which are disposed around the first sealing members to prevent the liquid from leaking between the adjacent plates.

13. The deionization apparatus according to claim 12, wherein each of the plurality of plates include a second rectangular fixing groove, larger than the first rectangular fixing groove, to fix the second sealing members.

14. The deionization apparatus according to claim 1, wherein the plurality of plates are molded of a resin material.

15. The deionization apparatus according to claim 1, wherein the plurality of plates are larger than the plurality of electrode modules by a specific size,
    the apparatus further includes a terminal to supply a power to each of the electrode modules among the plurality of electrode modules, and
    the terminal is coupled to each collector of the plurality of electrode modules.

16. The deionization apparatus according to claim 1, wherein the electrodes disposed on upper and lower surfaces of the collector are attached to the collector without using a conductive adhesion material.

17. A capacitive deionization apparatus which electrically and chemically removes ions from liquid, comprising:
    a plurality of spacer units having a plurality of electrode modules and a plurality of plates which support boundaries of the plurality of electrode modules spaced at specific intervals, a pair of end plates which are disposed at opposite ends of the plurality of spacer units and have openings for inlet or outlet of liquid, and coupling members which couple the plurality of spacer units and the pair of end plate units,
    wherein the plurality of plates are alternately stacked with the electrode modules and are made of a stiff material to uniformly maintain a spacing distance between the plurality of electrode modules regardless of a fastening force of the coupling members,
    wherein each of the electrode modules among the plurality of electrode modules includes a collector and electrodes having a size corresponding to the collector and disposed on upper and lower surfaces of the collector, and boundaries of the plurality of electrode modules are pressed by a pair of adjacent plates among the plurality of plates to maintain a contact therebetween.

18. The deionization apparatus according to claim 17, wherein the spacer units further include sealing members to prevent the liquid from leaking between the plurality of electrode modules and the plurality of plates.

19. A capacitive deionization apparatus which electrically and chemically removes ions from liquid, comprising:
a plurality of spacer units having a plurality of electrode modules and a plurality of plates which support boundaries of the plurality of electrode modules spaced at specific intervals, a pair of end plates which are disposed at opposite ends of the plurality of spacer units and have openings for inlet or outlet of liquid, and coupling members which couple the plurality of spacer units and the pair of end plate units,
wherein the plurality of plates are alternately stacked with the electrode modules and are made of a stiff material to uniformly maintain a spacing distance between the plurality of electrode modules regardless of a fastening force of the coupling members,
wherein a spacing member is disposed between adjacent electrode modules among the plurality of electrode modules, and
an inner portion of a boundary of each of the electrode modules among the plurality of electrode modules is pressed by the spacing member to maintain a contact between the electrodes and the collector.

20. The deionization apparatus according to claim 19, wherein the spacing member is formed as a single body with each of the plates among the plurality of plates to guide a flow of the liquid.

21. A capacitive deionization apparatus which electrically and chemically removes ions from liquid, comprising:
a plurality of spacer units having a plurality of electrode modules and a plurality of plates which support boundaries of the plurality of electrode modules spaced at specific intervals, a pair of end plates which are disposed at opposite ends of the plurality of spacer units and have openings for inlet or outlet of liquid, and coupling members which couple the plurality of spacer units and the pair of end plate units,
wherein the plurality of plates are alternately stacked with the electrode modules and are made of a stiff material to uniformly maintain a spacing distance between the plurality of electrode modules regardless of a fastening force of the coupling members,
wherein each of the spacer units further includes a terminal to supply a power to each of the electrode modules among the plurality of electrode modules, and
each of the plates among the plurality of plates further includes a terminal insertion portion to mount the terminal thereon such that the terminal is coupled to a collector which is included in each of the electrode modules among the plurality of electrode modules.

22. A capacitive deionization apparatus which includes a plurality of electrode modules, each having a collector and electrodes disposed on upper and lower surfaces of the collector to electrically and chemically remove ions from liquid, comprising:
a plurality of plates alternately stacked with the plurality of electrode modules such that the plurality of electrode modules are spaced at specific intervals, each of the plurality of plates including a groove formed on an inner portion of an upper and a lower surface of the plates; and
a first seal member disposed on the groove to cover upper and lower surfaces of each of the plurality of electrode modules and to seal the liquid between adjacent plates among the plurality of plates, the seal member being made from an elastic material.

23. The apparatus according to the claim 22, wherein the specific interval of the plurality of electrode modules depend upon a thickness of the first seal member.

24. The apparatus according to the claim 22, further comprising a second seal member disposed on a second groove formed on the plurality of plates.

25. The apparatus according to the claim, 24, wherein the combined thickness of the electrode module and twice the thickness of the first seal member substantially equals the thickness of the second seal member.

26. The apparatus according to the claim 22, wherein the plurality of plates are molded of a resin material.

27. The apparatus according to claim 22, wherein the plurality of plates are larger than the plurality of electrode modules by a specific size,
the apparatus further includes a terminal to supply a power to each of the electrode modules among the plurality of electrode modules, and
the terminal is coupled to each collector of the plurality of electrode modules.

28. A method of manufacturing a capacitive deionization apparatus which electrically and chemically removes ions from liquid, comprising:
alternately stacking a plurality of electrode modules and a plurality of plates on a first end plate having an opening for inlet or outlet of liquid, wherein the plurality of plates support boundaries of the electrode modules and are made of a stiff material to uniformly maintain a spacing distance between the electrode modules such that the plurality of electrode modules are spaced at specific intervals;
fixing first sealing members on each of the plurality of plates to cover upper and lower surfaces of each of the plurality of electrode modules to prevent the liquid from leaking between the plurality of electrode modules and the plurality of plates;
mounting a second end plate having an opening for inlet or outlet of liquid to correspond to the first end plate; and
coupling the first and second end plates with coupling members,
wherein the electrode modules include a collector and electrodes disposed on upper and lower surfaces of the collector to electrically and chemically remove ions from liquid, and
the collector and the electrodes of each electrode module among the plurality of electrode modules are pressed by a pair of adjacent plates among the plurality of plates to maintain a contact therebetween.

\* \* \* \* \*